US011367363B1

(12) United States Patent
Lin (10) Patent No.: US 11,367,363 B1
(45) Date of Patent: Jun. 21, 2022

(54) SYSTEMS, METHODS, AND APPARATUSES FOR OPERATING A MUSIC EDUCATIONAL TOOL

(71) Applicant: Bennett Samuel Lin, Westlake Village, CA (US)

(72) Inventor: Bennett Samuel Lin, Westlake Village, CA (US)

( * ) Notice: Subject to any disclaimer, the term of this patent is extended or adjusted under 35 U.S.C. 154(b) by 0 days.

(21) Appl. No.: 17/687,925

(22) Filed: Mar. 7, 2022

(51) Int. Cl.
  *G09B 15/00* (2006.01)
  *G09B 15/02* (2006.01)
  *G10G 1/00* (2006.01)
(52) U.S. Cl.
  CPC ......... *G09B 15/002* (2013.01); *G09B 15/023* (2013.01); *G10G 1/00* (2013.01)
(58) Field of Classification Search
  CPC ....... G09B 15/002; G09B 15/023; G10G 1/00
  See application file for complete search history.

(56) References Cited

U.S. PATENT DOCUMENTS

| | | | |
|---|---|---|---|
| 4,190,255 A | 2/1980 | Hughes | |
| 5,949,010 A * | 9/1999 | Hacker | G09B 15/003 84/476 |
| 7,781,662 B2 | 8/2010 | Lemons | |
| 8,146,920 B2 | 4/2012 | Hacker | |
| 8,847,055 B2 | 9/2014 | Rowe | |
| 9,403,084 B2 * | 8/2016 | Klemm | A63F 9/0666 |
| 9,691,295 B2 | 6/2017 | Rasanen | |
| 10,078,969 B2 * | 9/2018 | McClard | G09B 15/023 |
| 10,096,305 B2 | 10/2018 | Brenna | |
| 2006/0197285 A1 | 9/2006 | McNaill | |
| 2011/0031692 A1 | 2/2011 | Siegel | |
| 2012/0200037 A1 | 8/2012 | Wiehl | |
| 2019/0302702 A1 * | 10/2019 | Rubin | G04F 1/005 |
| 2021/0248918 A1 * | 8/2021 | Walls | G09B 15/026 |

\* cited by examiner

*Primary Examiner* — Robert W Horn
(74) *Attorney, Agent, or Firm* — Vincent G. LoTempio (57) ABSTRACT

Embodiments herein illustrate an educational musical game. The educational musical game includes a first set of polygon tokens representing a first combination of a first set of musical notes and a first musical interval between musical notes in the first set of musical notes. Further educational musical game includes a second set of polygon tokens representing a second combination of a second set of musical notes and a second musical interval between the musical notes in the second set of musical notes. The second set of polygon tokens is configured to be coupled with the first set of polygon tokens based on one or more rules associated with the first set of musical notes and the second set of musical notes.

20 Claims, 6 Drawing Sheets

SYSTEMS, METHODS, AND APPARATUSES FOR OPERATING A MUSIC EDUCATIONAL TOOL

TECHNICAL FIELD

The presently disclosed embodiments are related, in general, to a music educational tool. More particularly, the presently disclosed embodiments are related to methods, systems, and apparatuses for operating a music educational tool.

BACKGROUND

In some examples, the purpose of educational tools is to enable users or students to readily grasp the educational concepts. Some examples of the educational tools may include, but are not limited to, games, videos, and animations. Games present a unique way of understanding and learning the educational concepts. For instance, games may invoke a sense of competition amongst the students accordingly motivating them to put in extra efforts to learn the educational concepts. One such educational concept, where games may be used for learning purposes, is music. Understanding the music may involve learning various notes, chords, triads, and/or the like.

Applicant has identified a number of deficiencies and problems associated with conventional indicia scanner, and other associated systems and methods. Through applied effort, ingenuity, and innovation, many of these identified problems have been solved by developing solutions that are included in embodiments of the present disclosure, many examples of which are described in detail herein.

SUMMARY

Embodiments of the present disclosure relate to an educational musical game. The educational musical game comprises a first set of polygon tokens representing a first combination of a first set of musical notes and a first musical interval between musical notes in the first set of musical notes. The educational musical game comprises a second set of polygon tokens representing a second combination of a second set of musical notes and a second musical interval between the musical notes in the second set of musical notes. In an embodiment, the second set of polygon tokens is configured to be coupled with the first set of polygon tokens based on one or more rules associated with the first set of musical notes and the second set of musical notes, such that one or more combinations of the first set of musical notes and the second set of musical notes, formed based on coupling of the first set of polygon tokens and the second set of polygon tokens, represent a musical chord.

Embodiments of the present disclosure relate to a method for playing a musical education game. The method of playing the game comprises placing a first set of polygon tokens on a board of the musical education game, the first set of polygon tokens represents a first combination of a first set of musical notes and a first musical interval between musical notes in the first set of musical notes. The method of playing the game further comprises placing a second set of polygon tokens on the board of the musical educational game to abut the first set of polygon tokens. In an embodiment, the second set of polygon tokens represents a second combination of a second set of musical notes and a second musical interval between the musical notes in the second set of musical notes. The method of playing the game further comprises determining whether the placement of the second set of polygon tokens is correct based on the one or more rules associated with the first set of musical notes and the second set of musical notes.

Embodiments of the present disclosure relate to a computing device facilitating playing of the musical educational game. The computing device comprises a memory device configured to store set of instructions. A processor communicatively coupled to the memory device and the processor is configured to receive an input to place a first set of polygon tokens on a board of the musical education game displayed on a display unit of the computing device, the first set of polygon tokens represents a first combination of a first set of musical notes and a first musical interval between musical notes in the first set of musical notes. The processor is further configured to receive an input to place a second set of polygon tokens on the board of the musical educational game to abut the first set of polygon tokens. In an embodiment, the second set of polygon tokens represents a second combination of a second set of musical notes and a second musical interval between the musical notes in the second set of musical notes. In an embodiment, the processor is further configured to determine whether the placement of the second set of polygon tokens is correct based on the one or more rules associated with the first set of musical notes and the second set of musical notes.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Figure 1:
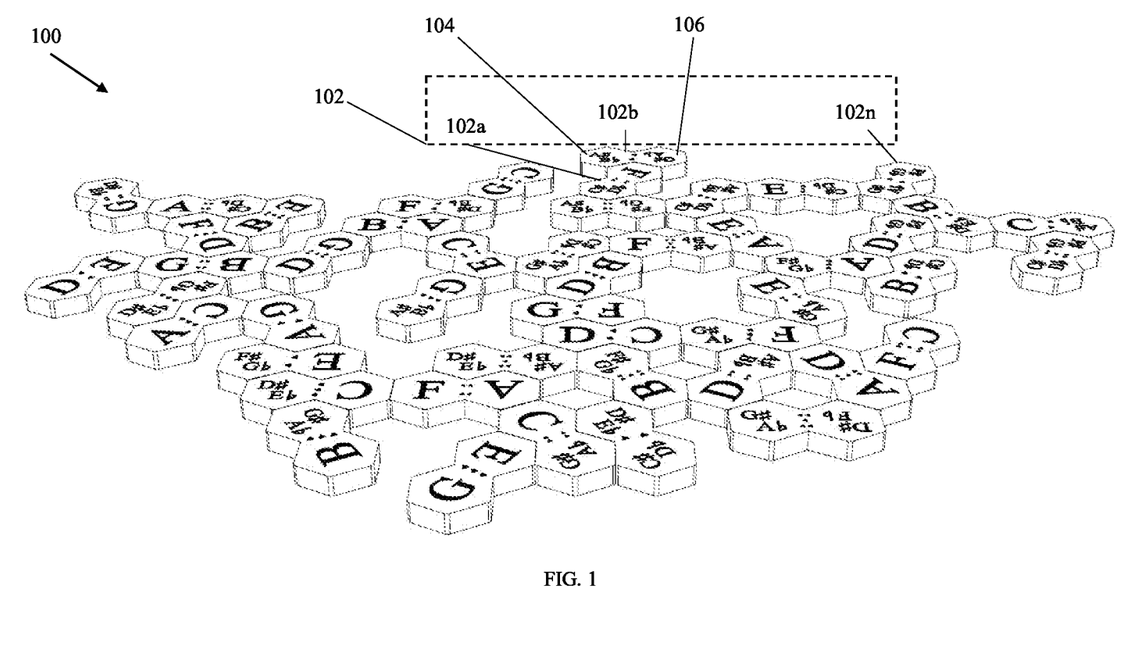
FIG. 1 illustrates a schematic of a musical educational game, according to one or more embodiments illustrated herein.

FIG. 1 illustrates a schematic of a musical educational game 100, according to one or more embodiments illustrated herein. The musical educational game 100 includes one or more sets of polygon tokens 102*a*, 102*b*, . . . 102*n* (hereinafter referred to as the sets of polygon tokens 102). Each of the sets of the polygon tokens 102 includes a first polygon token 104 and a second polygon token 106.[BL1][CZ2] The structure of the set of polygon tokens is described in conjunction with FIG. 2.

Figure 2:
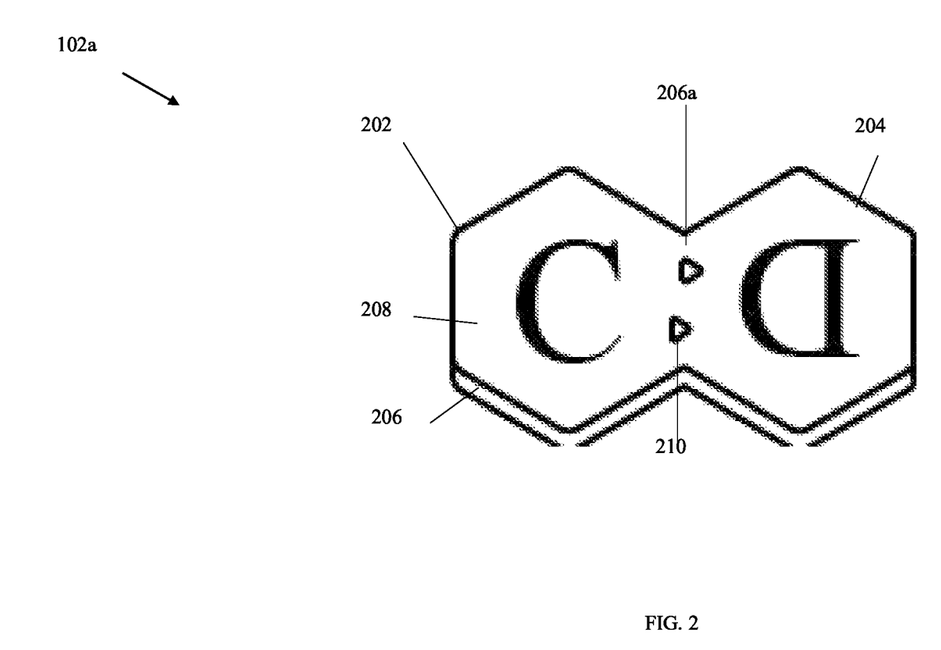
FIG. 2 illustrates a block diagram of a set of polygon tokens, according to one or more embodiments illustrated herein.

FIG. 2 illustrates a schematic of the sets of polygon tokens 102, according to one or more embodiments illustrated herein. In an example embodiment, each set of polygon tokens in the sets of polygon tokens 102 (e.g., the first set of polygon tokens 102*a*) includes a first polygon token 202 and a second polygon token 204. The structure of the first polygon token 202 is similar to the structure of the second polygon token 204. For the purpose of brevity, the structure of the first polygon token 202 is herein described. A person having ordinary skills in the art would appreciate that the structure described for the first polygon token 202 is applicable to the second polygon token 204.

The first polygon token 202 has one or more edges 206 and a face 208. The one or more edges 206 correspond to the one or more sides of the first polygon token 202. For example, if the first polygon token 202 is a hexagon, the count of the one or more edges 206 is six. In another example, if the first polygon token is a heptagon, the count of the one or more edges 206 is seven. In an exemplary embodiment, the one or more edges 206 encompass the face 208. In some examples, the face 208 has a first musical note. A musical note corresponds to a symbol denoting musical sound. Accordingly, the first polygon token 202 represents the first musical note. Similarly, the second polygon token 204 represents the second printed musical note. In conjunction the first set of polygon tokens 102*a* represents a first set of musical notes that includes the first musical note and the second musical note.

The first polygon token 202 is coupled to the second polygon token 204 at an edge 206*a* thereby forming the sets of polygon tokens 102. In some examples, the edge 206*a* is a common edge to the first polygon token 202 and the second polygon token 204. Since the first polygon token 202 represents the first musical note and the second polygon token 204 represents the second musical note, accordingly, the set of polygon tokens (i.e., combination of the first polygon token 202 and the second polygon token 204) represents the combination of the first musical note and the second musical note.

In an example embodiment, the common edge 206*a* has one or more predetermined printed symbols 210. In some examples, the one or more predetermined printed symbols 210 are indicative of a first musical interval between the first musical note and the second musical note. In some examples, a musical interval corresponds to a difference in pitch between the first musical note and the second musical note. Some examples of the first musical interval, diatonic scale, semitone, and/or the like. In some examples, a count of predetermined printed symbols 210 is deterministic of the musical interval. In some examples, the predetermined printed symbols 210 are represented by multiple triangles. To this end, the direction represented by the triangles is further deterministic of the musical interval. For example, the direction is indicative of the transition or chronology between the two musical notes.

Referring back to FIG. 1, the first set of polygon tokens 102*a* (of the one or more sets of polygon tokens 102) is configured to be abutted with the second set of polygon tokens 102*b* (of the one or more sets of polygon tokens 102). As discussed, each of the first set of polygon tokens 102*a* and the second set of polygon tokens 102*b* includes the first polygon token 202 and the second polygon token 204. Accordingly, one of the first polygon token 202 or the second polygon token 204, of the first set of polygon tokens 102*a*, is configured to be abutted to the first polygon token 202 or the second polygon token 204, of the second set of polygon tokens 102*b*. In some examples, a player of the musical education game 100 is configured to place the first set of polygon tokens 102*a* and the second set of polygon tokens 102*b* such that the first set of polygon tokens 102*a* and the second set of polygon tokens 102*b* abut each other. Further, the player may place the first set of polygon tokens 102*a* and the second set of polygon tokens 102*b* based on one or more rules. The one or more rules are further described in conjunction with FIG. 3.

Figure 3:
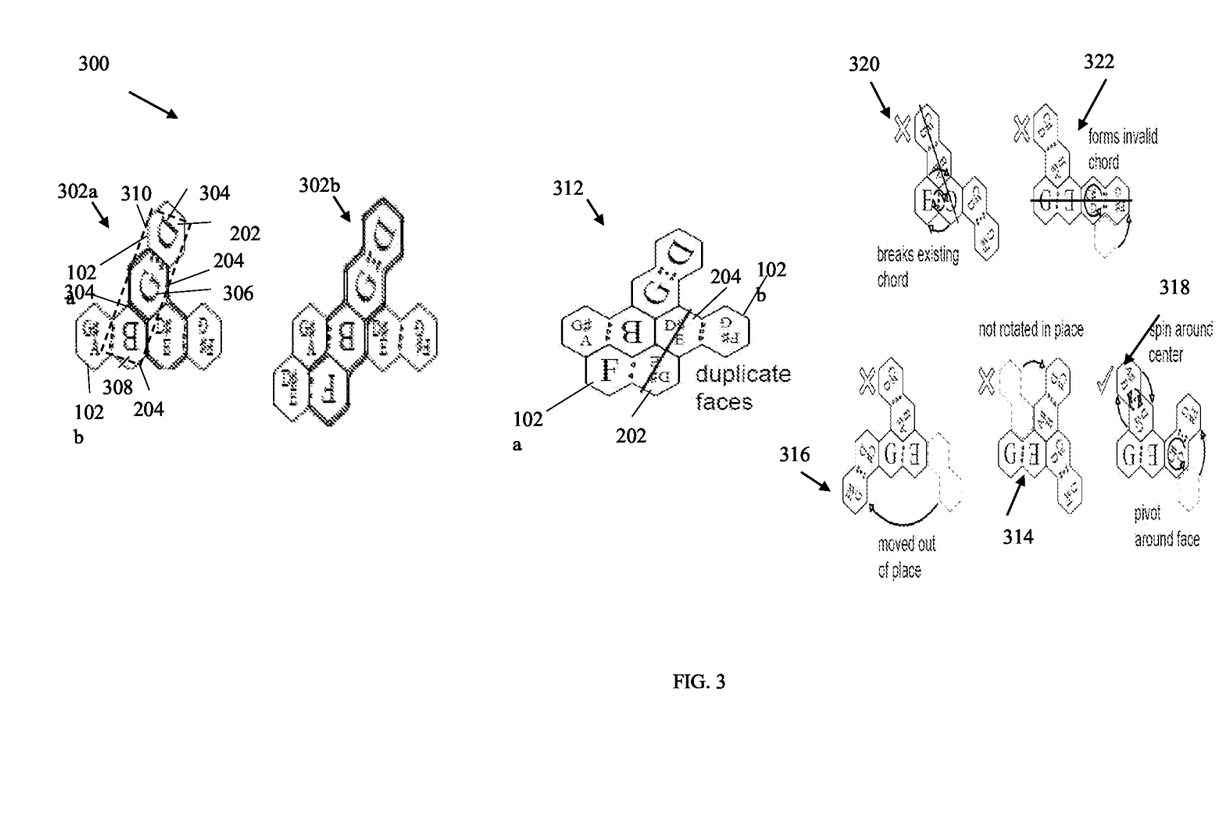
FIG. 3 illustrates example scenarios of playing the musical education game, according to one or more embodiments illustrated herein.

FIG. 3 illustrates one or more scenarios 300 depicting the one or more rules, according to one or more embodiments illustrated herein.

As depicted in a scenario 302a, of the one or more scenarios 300, the first set of polygon tokens 102a abuts the second set of polygon tokens 102b at the edge 304. To this end, the first polygon token 202 and the second polygon token 204 of the first set of polygon tokens 102a, and the second polygon token 204 of the second set of polygon tokens 102b are in the same row. In such a scenario 302, the first musical note 304, the second musical note 306, and the third musical note 308 indicated by the first polygon token 202 (of the first set of polygon tokens 102a), the second polygon token 204 (of the first set of polygon tokens 102a), and the second polygon token 204 (of the first set of polygon tokens 102b), respectively, together constitute a musical chord 310. In an exemplary embodiment, the musical chord 310 is a combination of one or more musical notes that when played together creates a harmony. If the musical chord so created by placing or abutting the first set of polygon tokens 102a with the second set of polygon tokens 102b, is correct, then placement of the second set of polygon tokens 102b is considered to be correct. Accordingly, the first rule is to place the first set of polygon tokens 102a and the second set of polygon tokens 102a such that combination of musical tones creates a correct musical chord.

In some examples, determining whether the combination of musical notes is a correct chord is further based on one or more music rules. For example, the one or more rules may include rules pertaining to musical interval between the musical notes in the musical chord. For example, for a chord to be correct, the musical interval between the first two musical notes needs to be three and the musical interval between the last two musical notes needs to be four. In another example, for a chord to be correct, the musical interval between the first two musical notes needs to be four and the musical interval between the last two musical notes needs to be three. Similarly, other musical rules may be utilized to determine if the musical chord so formed by placing the first set of polygon tokens 102a and the second set of polygon tokens 102b.

Those having ordinary skills in the art would appreciate that the scope of the disclosure is not limited to having three polygon tokens in a single row. In an exemplary embodiment, when the first set of polygon tokens 102a and the second set of polygon tokens 102b abut each other, more than three polygon tokens may be included in the row, as is depicted by 302b.

In another scenario 312, the first set of polygon tokens 102a and the second set of polygon tokens 102b abut each other at the edge 304. To this end, the first polygon token 202 of the first set of polygon tokens 102a, and the second polygon token 204 of the second set of polygon tokens 102b are in the same row. If polygon tokens that abut each other (for example, the first polygon token 202 of the first set of polygon tokens 102a and the second polygon token 204 of the second set of polygon tokens 102b) represent the same musical note, in such a scenario the placement of the first set of polygon tokens 102a and the second set of polygon tokens 102b, is incorrect.

In another scenario, the first set of polygon tokens 102a and the second set of polygon tokens 102b abut each other at the edge 304. A player of the musical education game 100 can rotate one of the first set of polygon tokens 102a or the second set of polygon tokens 102b. To rotate, the player cannot change the edge at which the first set of polygon tokens 102a and the second set of polygon tokens 102b abut each other (as is depicted in 314). Further, the player cannot change the polygon token to which the second set of polygon tokens 102b is originally abutting (as is depicted in 316). For example, if the second set of polygon tokens 102b is originally abutting the first token 202 of the first set of polygon tokens 102a, then the player cannot rotate to cause the second set of polygon tokens 102b to abut the second polygon token 204 of the first set of polygon tokens 102a. In some examples, the player is allowed swap abutment of the first polygon token 202 (of the second set of polygon tokens 102b) with the second polygon token 204 (of the second set of polygon tokens 102b) with the first set of polygon tokens 102a (as is depicted by 318). Additionally, the player is not allowed to move the second set of polygon tokens 102b if it breaks an existing musical chord or creates an invalid chord (depicted by 320 and 322, respectively).

Figure 4:
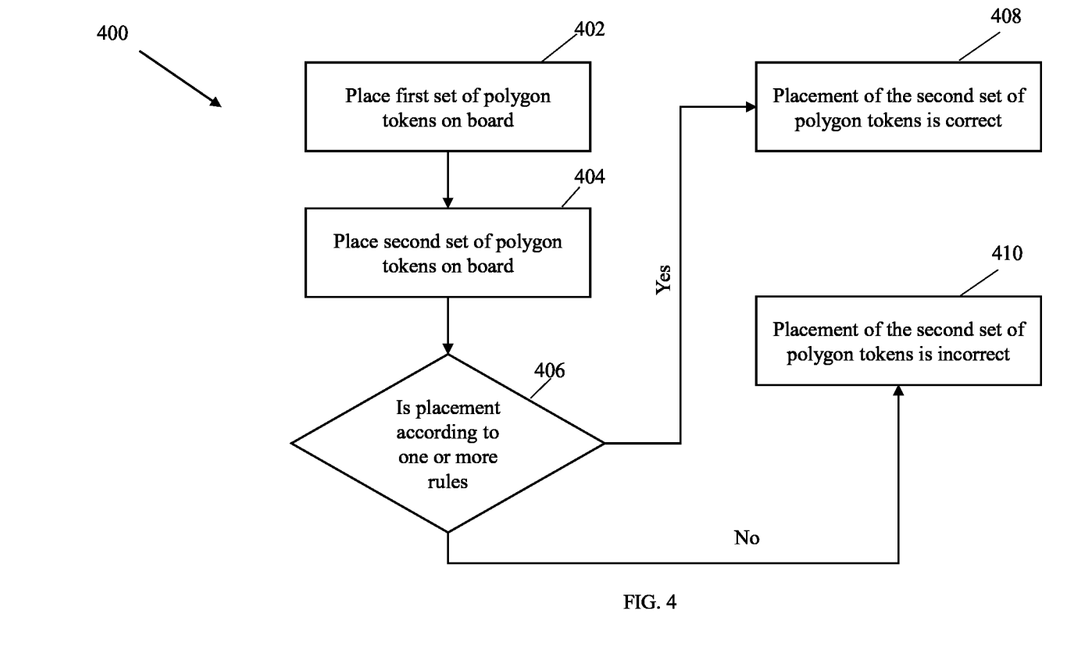
FIG. 4 illustrates a method of operating the musical educational game, according to one or more embodiments illustrated herein.

FIG. 4 illustrates a method for playing the musical educational game 100, according to one or more embodiments illustrated herein.

At step 402, a first player places a first set of polygon tokens 102a on a board of the musical educational game 100. At step 404, a second player places a second set of polygon tokens 102b on the board of the musical educational game 100 such that the first set of polygon tokens 102a abuts the second set of polygon tokens 102b. At step 406, a check is performed to determine whether the placement of the second set of polygon tokens 102b on the board is in accordance with the one or more rules. The one or more rules are illustrated above in conjunction with FIG. 3. If it is determined that of the musical educational game 100 such that the first set of polygon tokens 102a abuts the second set of polygon tokens 102b according to the one or more rules, step 408 is performed. However, if it is determined that the first set of polygon tokens 102a abuts the second set of polygon tokens 102b not according to the one or more rules, step 410 is performed. At step 408, the placement of the second set of polygon tokens 102b is determined to be correct. At step 410, the placement of the second set of polygon tokens 102b is determined to be incorrect.

In some examples, the scope of the disclosure is not limited to the musical educational game 100 to be a board game. In an exemplary embodiment, the musical educational game 100 can be implemented and played on a computing device, as is described in FIG. 5.

Figure 5:
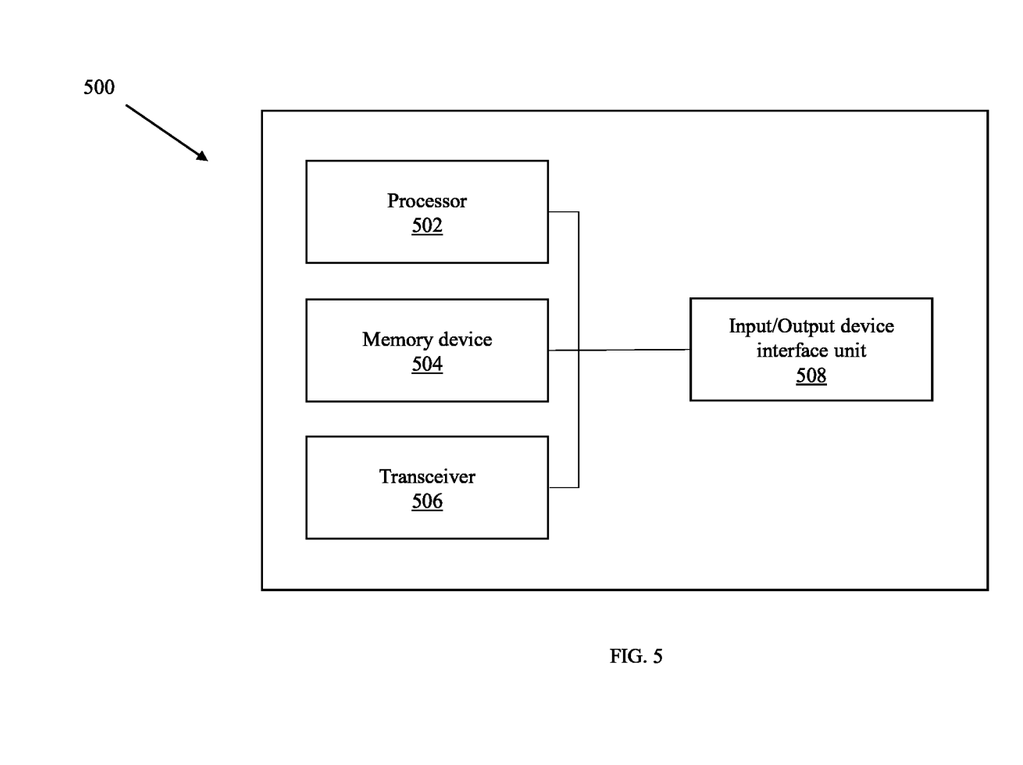
FIG. 5 illustrates a block diagram of a computing device to play the musical educational game, according to one or more embodiments illustrated herein.

FIG. 5 illustrates a block diagram of the computing device 500, according to one or more embodiments illustrated herein. The computing device 500 includes a processor 502, a memory device 504, a transceiver 506, and an input/output device interface unit 508.

The processor 502 may be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof.

Accordingly, although illustrated in FIG. 2 as a single controller, in an example embodiment, the processor 502 may include a plurality of processors and signal processing modules. The plurality of processors may be embodied on a single electronic device or may be distributed across a plurality of electronic devices collectively configured to function as the circuitry of the computing device 500. The plurality of processors may be in operative communication with each other and may be collectively configured to perform one or more functionalities of the circuitry of the computing device 500, as described herein. In an example embodiment, the processor 502 may be configured to execute instructions stored in the memory device 504 or otherwise accessible to the processor 502. These instructions, when executed by the processor 502, may cause the circuitry of the computing device 500 to perform one or more of the functionalities, as described herein.

Whether configured by hardware, firmware/software methods, or by a combination thereof, the processor 502 may include an entity capable of performing operations according to embodiments of the present disclosure while configured accordingly. Thus, for example, when the processor 502 is embodied as an ASIC, FPGA or the like, the processor 502 may include specifically configured hardware for conducting one or more operations described herein. Alternatively, as another example, when the processor 502 is embodied as an executor of instructions, such as may be stored in the memory device 504, the instructions may specifically configure the processor 502 to perform one or more algorithms and operations described herein.

Thus, the processor 502 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 504 may include suitable logic, circuitry, and/or interfaces that are adapted to store a set of instructions that is executable by the processor 502 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory device 504 may be integrated with the processor 502 on a single chip, without departing from the scope of the disclosure.

The transceiver 506 may correspond to a communication interface that may facilitate transmission and reception of messages and data to and from various devices (e.g., other computing devices (not shown)). Examples of the transceiver 506 may include, but are not limited to, an antenna, an Ethernet port, a USB port, a serial port, or any other port that can be adapted to receive and transmit data. The transceiver 506 transmits and receives data and/or messages in accordance with the various communication protocols, such as, Bluetooth®, Infra-Red, I2C, TCP/IP, UDP, and 2G, 3G, 4G or 5G communication protocols.

The input/output device interface unit 508 includes a suitable logic and/or circuitry that enables the input/output device interface unit 508 to receive input from the player. In an exemplary embodiment, the player receives the input through devices such as, but not limited to, keyboard, touch pad, touch screen, mouse, or any other device that is capable of providing input to the computing device 500.

Figure 6:
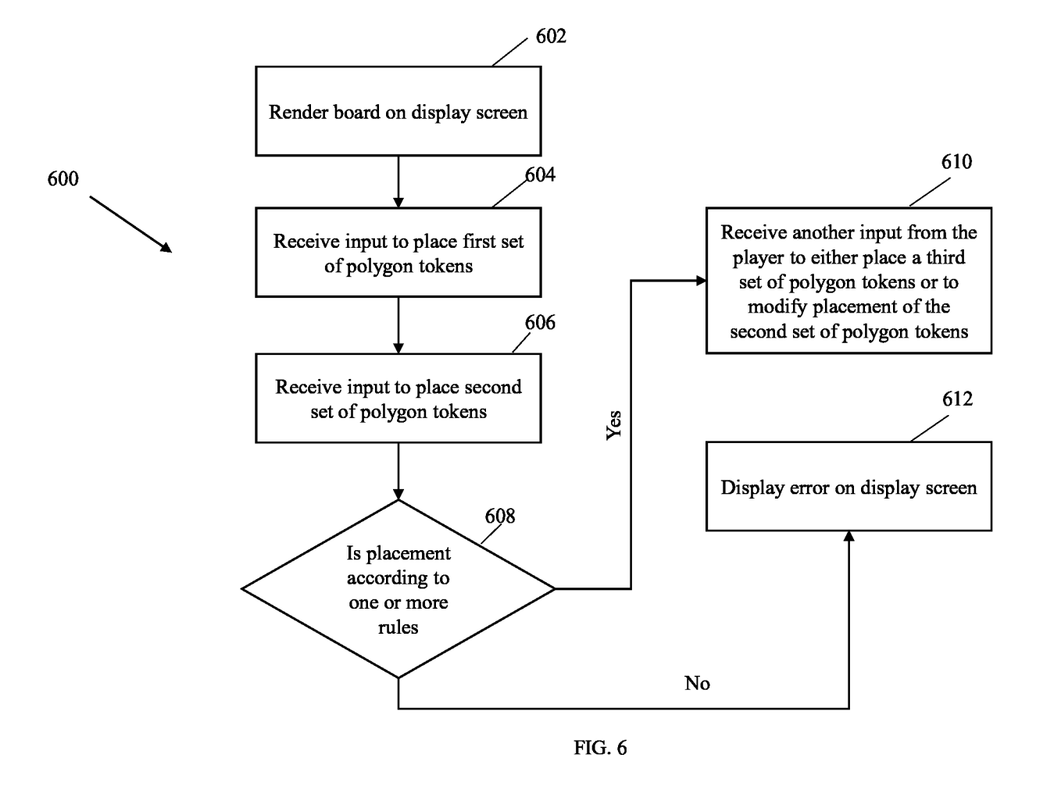
FIG. 6 illustrates a method for playing the musical educational game, according to one or more embodiments illustrated herein.

The operation of the computing device 500 is further described in conjunction with FIG. 6. FIG. 6 illustrates a flowchart 600 of a method for playing the musical educational game 100 on the computing device 500.

At step 602, the board of the musical educational game 100 is rendered on a display screen of the computing device 102. In an exemplary embodiment, the processor 502 may be configured to cause the display screen of the computing device 102 to render the board of the musical education game 100. In some examples, the processor 502 may be configured to utilize known techniques to render the board on the display screen of the computing device 502. Some examples of the techniques to render the board of the musical educational game 102 include, but are not limited to, rasterization, ray casting, ray tracing, and/or the like.

At step 604, an input from a user of the computing device 102 is received to place the first set of polygon tokens 102a on the board of the musical educational game 100. In an exemplary embodiment, the processor 502 may be configured to receive the input from the user through the input/output device interface unit 408.

At step 606, another input from another user of the computing device 102 is received to place the second set of polygon tokens 102b on the board of the musical educational game 100. In an exemplary embodiment, the processor 502 may be configured to receive the input from the other user through the input/output device interface unit 408. In an alternative embodiment, the processor 502 may be configured to place the second set of polygon tokens 102b on the board automatically.

At step 608, a check is performed to determine whether the placement of the second set of polygon tokens 102b is correct based on the one or more rules described in conjunction with FIG. 3. If the placement of the second set of polygon tokens 102b is correct, the processor 502 is configured to perform the step 610. Else the processor 502 is configured to perform the step 612.

At step 610, an error is displayed on the display screen of the computing device 102. In an exemplary embodiment, the processor 502 may be configured to cause the display screen to display the error. At step 612, another input from the user of the computing device 500. In an exemplary embodiment, the processor 502 may be configured to receive the other input from the user through the input/output interface unit 508. In some examples, the other input from the user may correspond to at least one of the first set of polygon tokens 102a or the second set of polygon tokens 102b, or placing a third set of polygon tokens 102c on the board of the musical educational game 100.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. An educational musical game, the educational musical game comprises:
    a first set of polygon tokens representing a first combination of a first set of musical notes and a first musical interval between the musical notes in the first set of musical notes; and
    a second set of polygon tokens representing a second combination of a second set of musical notes and a second musical interval between the musical notes in the second set of musical notes,
    wherein the second set of polygon tokens is configured to be coupled with the first set of polygon tokens based on one or more rules associated with the first set of musical notes and the second set of musical notes, such that one or more combinations of the first set of musical notes and the second set of musical notes, formed based on coupling of the first set of polygon tokens and the second set polygon tokens, represents a musical chord.

2. The educational musical game of claim 1, wherein the first set of polygon tokens further comprises a first polygon token representing a first musical note.

3. The educational musical game of claim 2, wherein the first set of polygon tokens further comprises a second polygon token representing a second musical note, wherein the combination of the first musical note and the second musical note constitute the first set of musical notes.

4. The educational musical game of claim 3, wherein the second polygon token abuts the first polygon token at a first edge, common to the first polygon token and the second polygon token, wherein the first edge represents a musical interval between the first musical note and the second musical note.

5. The educational musical game of claim 3, wherein the first set of polygon tokens represents a combination of the first musical note and the second musical note.

6. The educational musical game of claim 1, wherein the second set of polygon tokens comprises a first polygon token and a second polygon token.

7. The education musical game of claim 6, wherein the first polygon token of the second set of polygon tokens represents a third musical note and the second polygon token of the second set of polygon tokens represents a fourth musical note, wherein the combination of the third musical note and the fourth musical note constitutes the second set of musical notes.

8. A method for playing a musical education game comprises:
    placing a first set of polygon tokens on a board of the musical education game, the first set of polygon tokens represents a first combination of a first set of musical notes and a first musical interval between musical notes in the first set of musical notes;
    placing a second set of polygon tokens on the board of the musical educational game to abut the first set of polygon tokens, wherein the second set of polygon tokens represents a second combination of a second set of musical notes and a second musical interval between the musical notes in the second set of musical notes; and
    determining whether the placement of the second set of polygon tokens is correct based on the one or more rules associated with the first set of musical notes and the second set of musical notes.

9. The method of claim 8, wherein determination further comprises determining whether the combination of the first set of musical notes and the second set of musical notes forms a valid musical chord.

10. The method of claim 9 further comprising rotating at least one of the first set of polygon tokens or the second set of polygon tokens.

11. The method of claim 10 further comprising determining whether rotating the first set of polygon tokens or the second set of polygon tokens breaks existing musical chord, wherein rotating is held invalid if the existing musical chord breaks.

12. The method of claim 8, wherein the determination further comprises determining whether polygon tokens of at least one of the first set of polygon tokens or the second set of polygon tokens, abutting each other represent same musical tone.

13. The method of claim 12, wherein the placement of the second set of polygon tokens is determined to be incorrect if at least one of the first set of polygon tokens or the second set of polygon tokens, abutting each other represent same musical tone.

14. A computing device facilitating playing of the musical educational game, the computing device comprises:
   a memory device configured to store set of instructions:
   a processor communicatively coupled to the memory device, wherein the processor is configured to:
      receive an input to place a first set of polygon tokens on a board of the musical education game displayed on a display unit of the computing device, the first set of polygon tokens represents a first combination of a first set of musical notes and a first musical interval between musical notes in the first set of musical notes;
      receive an input to place a second set of polygon tokens on the board of the musical educational game to abut the first set of polygon tokens, wherein the second set of polygon tokens represents a second combination of a second set of musical notes and a second musical interval between the musical notes in the second set of musical notes; and
      determining whether the placement of the second set of polygon tokens is correct based on the one or more rules associated with the first set of musical notes and the second set of musical notes.

15. The computing device of claim 14, wherein the first set of polygon tokens further comprises a first polygon token representing a first musical note.

16. The computing device of claim 15, wherein the first set of polygon tokens further comprises a second polygon token representing a second musical note, wherein the combination of the first musical note and the second musical note constitutes the first set of musical notes.

17. The computing device of claim 16, wherein the second polygon token abuts the first polygon token at a first edge, common to the first polygon token and the second polygon token, wherein the first edge represents a musical interval between the first musical note and the second musical note.

18. The computing device of claim 16, wherein the first set of polygon tokens represents a combination of the first musical note and the second musical note.

19. The computing device of claim 14, wherein the second set of polygon tokens comprises a first polygon token and a second polygon token.

20. The computing device of claim 19, wherein the first polygon token of the second set of polygon tokens represents a third musical note and the second polygon token of the second set of polygon tokens represents a fourth musical note, wherein the combination of the third musical note and the fourth musical note constitutes the second set of musical notes.

\* \* \* \* \*